May 2, 1967     E. R. ANDERSON     3,317,027
ORIENTING MEANS AND METHOD FOR FRUIT AND VEGETABLE ARTICLES
Filed Dec. 14, 1964     5 Sheets-Sheet 1
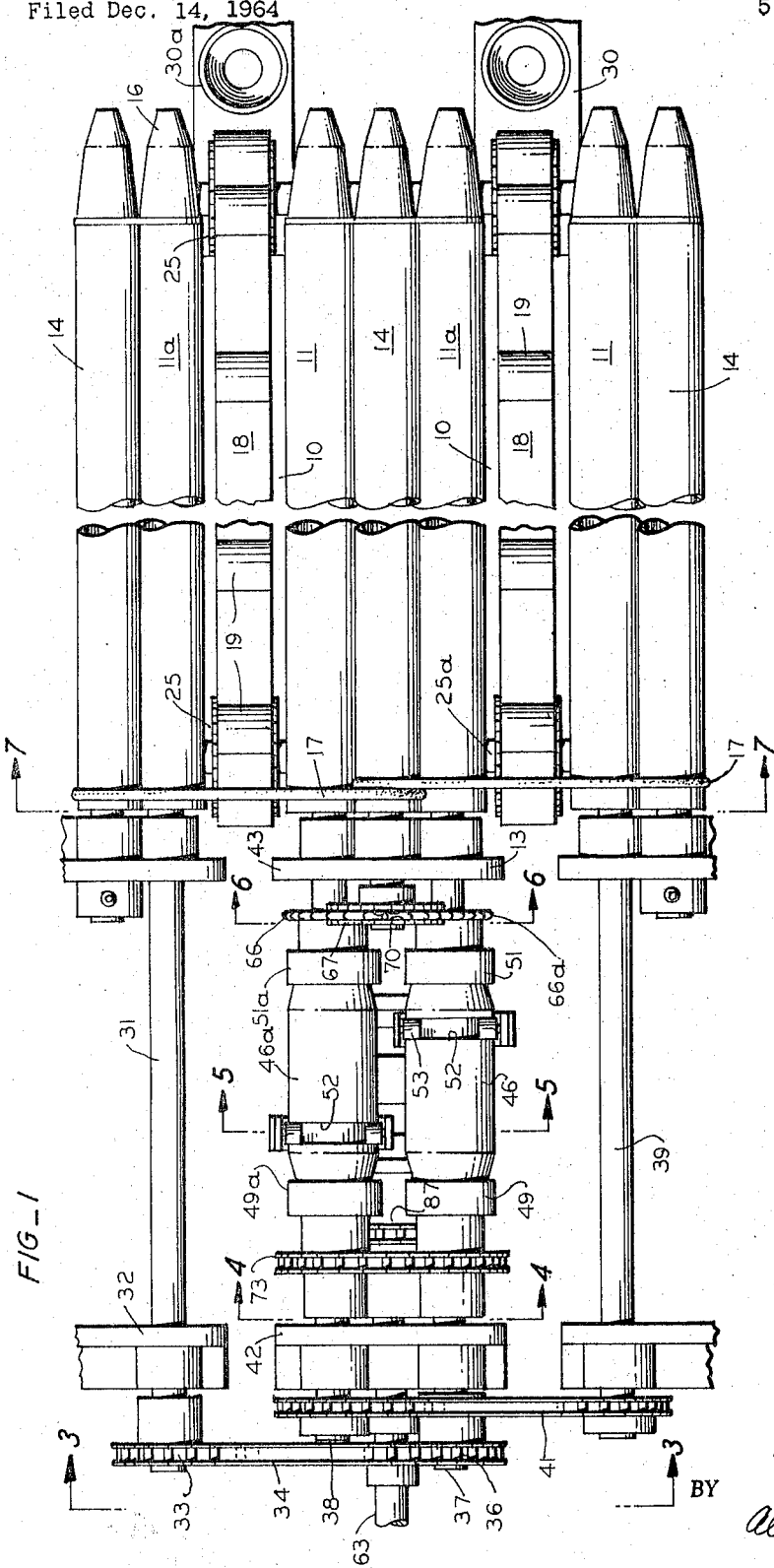
INVENTOR.
EARL R. ANDERSON
BY
ATTORNEYS

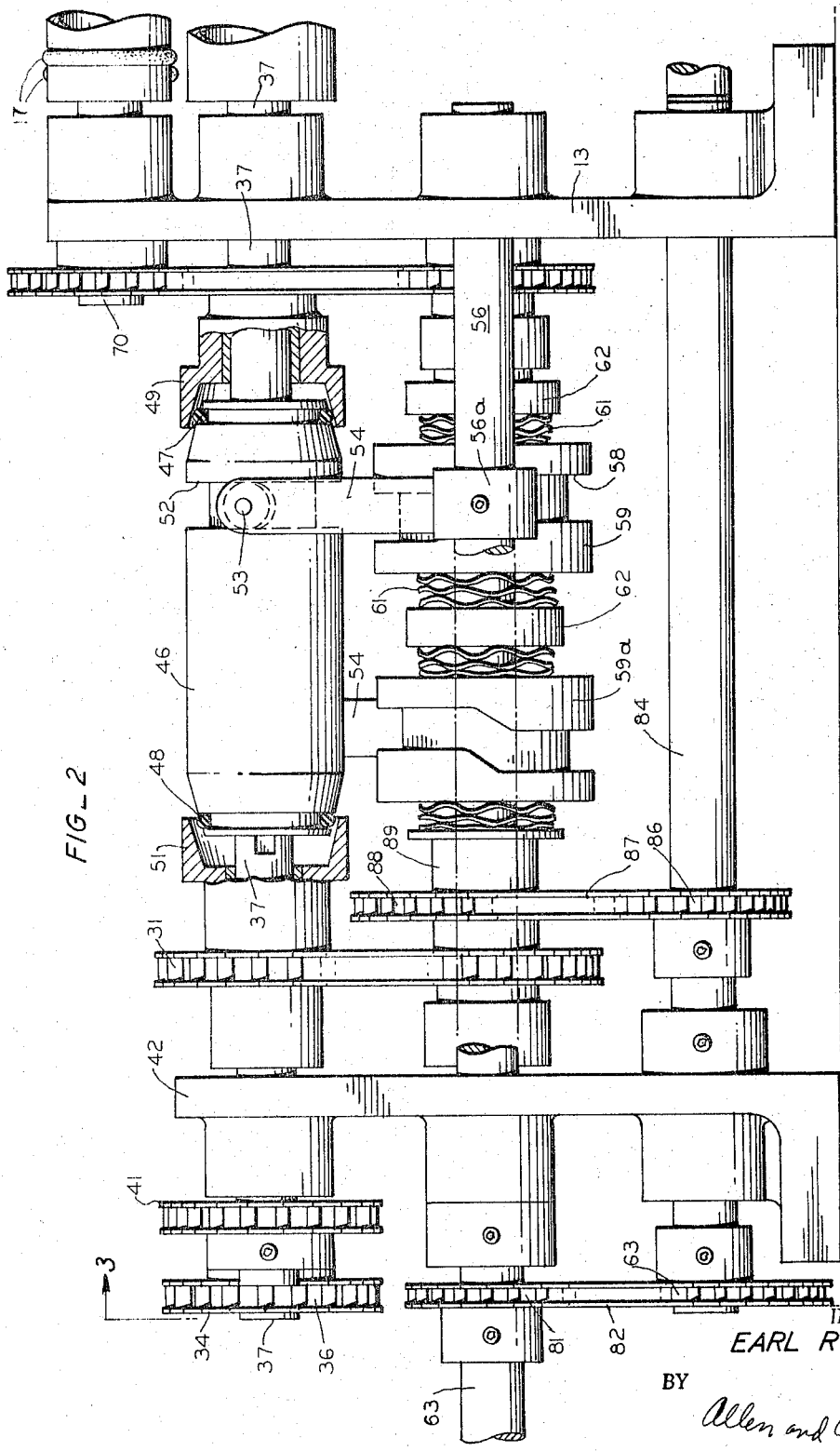

May 2, 1967 E. R. ANDERSON 3,317,027
ORIENTING MEANS AND METHOD FOR FRUIT AND VEGETABLE ARTICLES
Filed Dec. 14, 1964 5 Sheets-Sheet 3
FIG_3
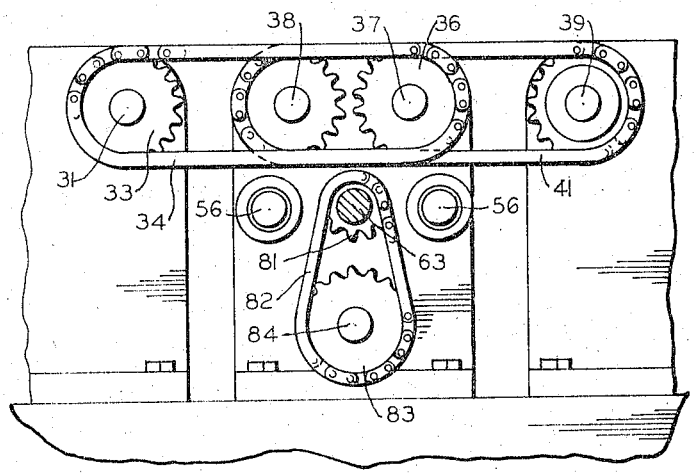
FIG_4
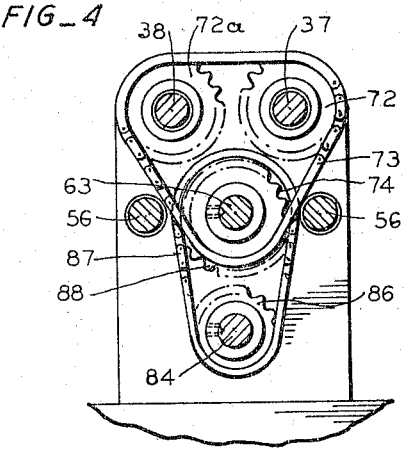
FIG_5
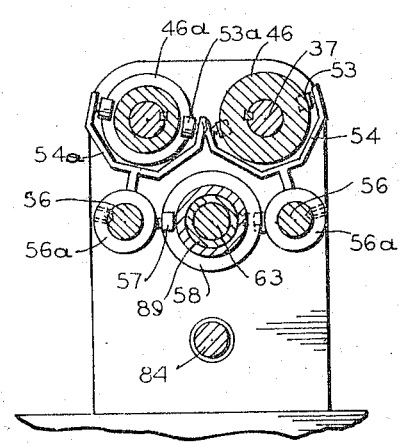
INVENTOR.
EARL R. ANDERSON
BY
Allen and Chromy
ATTORNEYS

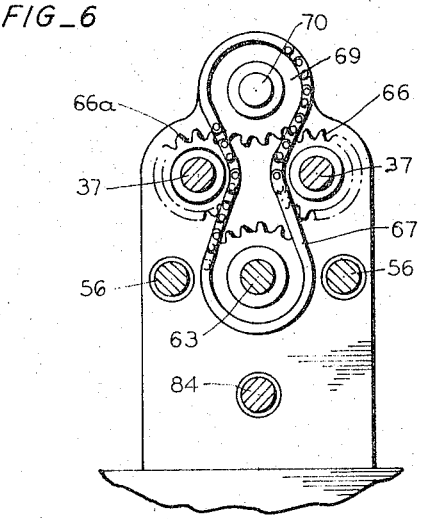
FIG_6
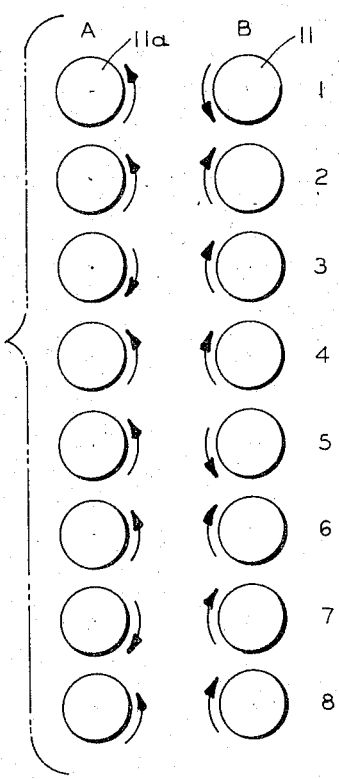
FIG_8
FIG_7
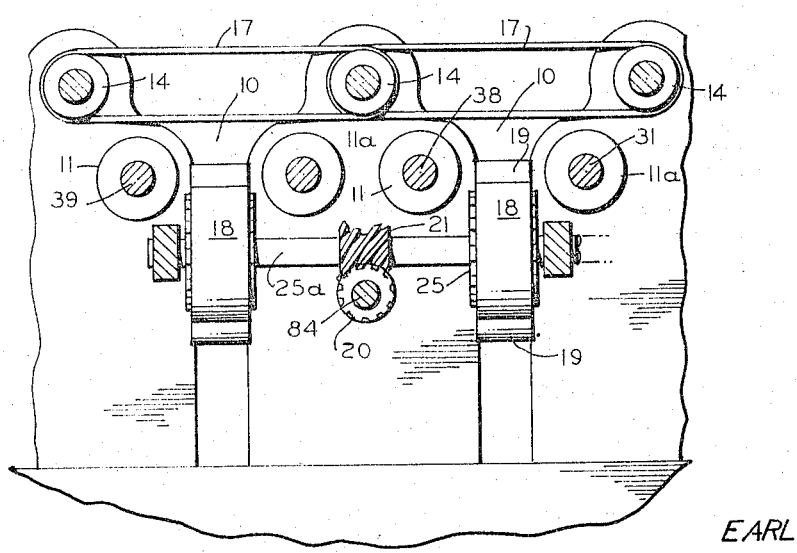
INVENTOR.
EARL R. ANDERSON
BY
ATTORNEYS

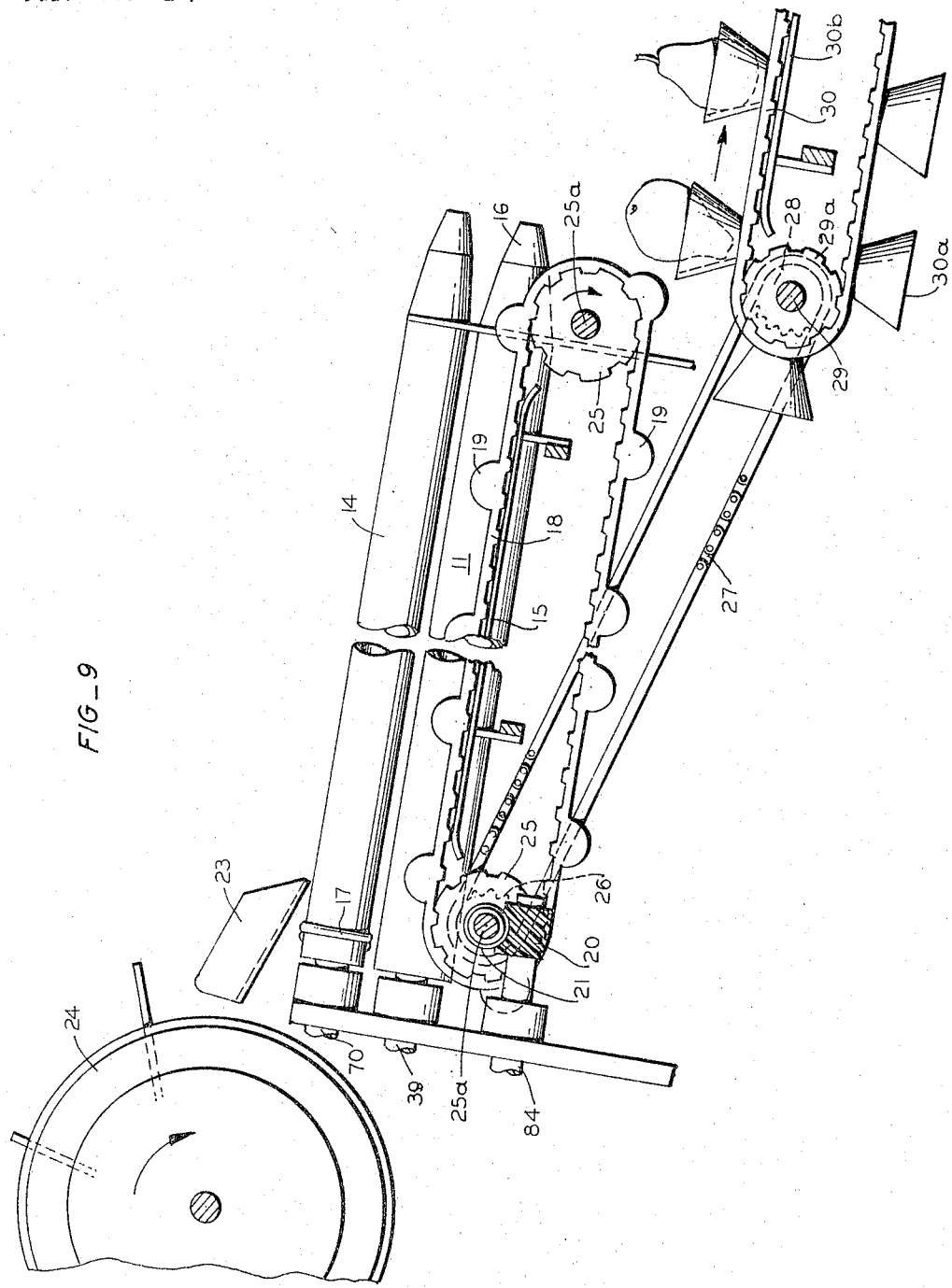

United States Patent Office 3,317,027
Patented May 2, 1967

3,317,027
ORIENTING MEANS AND METHOD FOR FRUIT AND VEGETABLE ARTICLES
Earl R. Anderson, Los Gatos, Calif., assignor to Philip H. Allen, Saratoga, Calif.
Filed Dec. 14, 1964, Ser. No. 418,000
11 Claims. (Cl. 198—33)

The present invention relates to the positioning of fruit and vegetable articles in a given oriented position in conjunction with the feeding thereof and is concerned more particularly with a pair of supporting rollers for the articles and means for controlling direction of the rotation of the articles in a given sequence to first apply a rotating effect to the articles in one direction, for thereafter removing the rotating effect for a given period, and for thereafter applying a rotating effect in the opposite direction to said articles.

It is a general object, therefore, to provide improved means for orienting articles on a pair of rollers.

A further object of the invention is to provide for orienting of elongated articles to place their long axes generally parallel to the axes of the rollers for subsequent handling.

Still another object of the invention is to provide for orienting elongated articles to first place their long axes generally parallel to the axes of the orienting rollers therefor and to deliver them from the rollers to pocket means in the conveyor where their long axes are again similarly oriented.

A still further object of the invention is to provide a fruit feed and orienting system in which a single file of fruit in spaced-apart relation is delivered to the orienting means where it is oriented and delivered in timed fashion to a series of conveyor pockets for subsequent processing.

Other objects and advantages of the invention will be apparent from the following description of a preferred embodiment thereof, taken in conjunction with the accompanying drawings, in which:

FIG. 1 is a plan view of apparatus embodying the invention.

FIG. 2 is a fragmentary elevational view partially in section illustrating the drive means for the rollers.

FIG. 3 is an end elevational view of a portion of the drive means taken as indicated by the line 3—3 and shown on reduced scale.

FIG. 4 is a sectional view of the drive mechanism taken as indicated by the line 4—4 in FIG. 1.

FIG. 5 is a sectional elevational view of a portion of the drive mechanism taken as indicated by the line 5—5 in FIG. 1.

FIG. 6 is also a sectional elevational view of the drive mechanism taken as indicated by the line 6—6 in FIG. 1.

FIG. 7 is a sectional view illustrating the array of rollers and is taken as indicated by the plane of the line 7—7 in FIG. 1.

FIG. 8 is a schematic view illustrating in sequence either from top to bottom a controlled sequence of the direction of rotation of the rollers with respect to each other in order to effect the orienting and control of the food or vegetable article.

FIG. 9 is a schematic side elevational view of the apparatus illustrating the rollers orienting means in relation to the feed means therefor and discharge means therefrom.

Referring first to FIGS. 1 and 2 there is shown two valleys 10 for the positioning of the fruit defined by respective sets of rollers 11 and 11a which are journalled in respective supporting brackets 12 and 13. Above the adjacent center rollers 11 and 11a is a third roller 14, also journalled in the brackets 12 and 13, and above each of the rollers 11 and 11a there is a similar roller 14. The rollers 14 (FIGS. 1 and 7) are driven continuously in the same direction by a pair of O-ring belts 17 as seen in FIGS. 1 and 7. As seen in FIG. 7, for example, two article orienting valleys are provided with two active rollers 11 and 11a in each valley, the upper rollers 14 merely serving to prevent accidental discharge of an article from the valley. The rollers 11 and 11a have tapered discharge extensions 16. Between each of the rollers 11 and 11a there is provided a timing belt or article separating conveyor 18. The belt 18 has rounded lugs 19 spaced at intervals therealong to provide article pockets which travel at substantially the same speed as an article traveling down the inclined rollers 11 and 11a so as to keep the articles thereon separated. The vertical positioning of the timing belt 18 is such that its continuous portion is ineffective with respect to articles supported by the rollers 11 and 11a except where the article has a small end, such as a pear, which may rest on the timing belt. The lugs 19 of the belt, however, are high enough to separate the articles carried by the rollers 11 and 11a. The lugs 19 are of rounded contour to avoid inadvertent effects on an article as the stems of articles such as pears will not be caught by the lugs. The articles such as pears are fed to the spaces between lugs 19 of the timing belt 18 by a trough 23 which receives the articles in article-by-article fashion from a single file feed mechanism 24 of the character disclosed in my patent 3,109,866. The timing belt 18 has its upper stretch slidably supported by a plate 15 and is carried by respective sprockets 25 supported by suitable shafts 25a and one shaft 25a carries a drive sprocket 26 connected by chain 27 with a driven sprocket 28 mounted on a drive shaft 29. The shaft 29 carries a drive sprocket 29a for a discharge conveyor or timing belt 30 slidably supported by a plate 30b having pockets 30a to receive pears or other fruit or vegetable articles in oriented position from the rollers 11 and 11a and the lugs 19. In order to drive the drive sprocket 26 and the timing belt 18 as well as the discharge belt 30, the left hand shaft 84 carries a worm 20 engaged with a worm wheel 21 on the support shaft 25a for sprocket 25.

The drive for the rollers 11 and 11a of each pair are provided by means including a shaft extension 31 (FIG. 1) from one of the rollers 11a, which is journalled in support brackets 13 and 32 and carries at its outer end a sprocket 33 engaged by a chain 34 (FIGS. 1 and 3). The chain 34 is also engaged with a sprocket 36 on the end of a shaft 37 for the second roller 11a similarly the shafts 38 and 39 for the rollers 11 are connected by a chain 41.

In order to provide a reversing drive for the rollers 11 in timed relation to the operation of the other components including the drive for the opposite rollers 11a, the drive shaft 39 (FIG. 2) for the rollers 11 is journalled in the brackets 13 and 42 and is slotted to provide a keyed connection to a drive element 46 thereon. This drive element has an O-ring friction drive element co-operate with respective tapered clutch elements 49 and 51 journalled on the shaft 37. The clutch member 46 has an annular groove 52 which is engaged by respective rollers 53 at the ends of a fork 54 which is secured at its lower end to a bushing 56a on a shaft 57 slidably mounted in the respective brackets 42 and 13. This bushing 56 (FIG. 5) carries a roller 57 seated in a cam groove 58 a control cam roller 59 which is held in approximately centered relation by a plurality of spring washers 61 between collars 62 on a shaft 63.

The driving clutch element 49 (FIGS. 2 and 6) carries a sprocket 66 meshing with a chain 67 which at its lower end also meshes with a sprocket 68 on the shaft 63 and at its upper end passes about a sprocket 69 on the drive shaft 70 for the center roller 14. The clutch collar 66a (FIG. 6) for the rollers therefore is driven in a direction oppositely from the collars 66.

The clutch driving element 51 (FIG. 2) at the left hand end of the drive element 46 is journalled on the shaft 37 and its sleeve hub carries a sprocket 72 engaged by a chain 73 which also meshes with a sprocket 74 on the shaft 63 and with a sprocket 72a journalled on the shaft 38. The sprocket 72 and 72a are rotated in the same direction, while the sprockets 66 and 66a are rotated in opposite directions so that the respective clutch elements 49 and 51 and 49a and 51a at the respective ends of the clutch connector and drive element 46 and 46a are rotated oppositely and are controlled by the cam slots 58 in the cam sleeves 59. The cam slots 58 are displaced 180° from each other.

The drive shaft 63 (FIG. 3) is provided with a sprocket 81 which is connected by a chain 82 with a larger sprocket 83 on the shaft 84 journalled in the brackets 13 and 42. The shaft 84 (FIG. 4) is provided with a sprocket 86 connected by chain 87 with a sprocket 88 carried by a sleeve 89 on which the cam cylinders 59 and 59a are secured. As previously described the shaft 63 provides a 1 to 1 ratio drive for the roller shaft 37 and 38 and the gear ratios provided by selecting the sprockets 81 and 83 (FIG. 3) and 86 and 87 (FIG. 4) provide the desired gear ratio between the shaft 63 and the sleeve 89 and thereby the desired gear ratio between the number of turns of the rollers 11 and 11a with respect to the directions of rotation by the shifting control of the cam cylinders 59 and 59a. Because the active cam portions of the two cam cylinders 59 and 59a are 180° apart, there will be an equal rotation both of the rollers 11 and 11a in both a counter-clockwise and clockwise direction.

FIG. 8 illustrates the operation of the rollers 11 and 11a as a result of the clutching mechanisms and the timing control of the respective cam cylinders 59 and 59a to intermittently effect the reversing of the two rollers. As shown in position "1" the roller 11a is rotating in a counter-clockwise direction and the roller 11 is also rotating in a counter-clockwise direction. In position "2" the roller 11a continues to rotate in a counter-clockwise direction while the roller 11 is rotated in a clockwise direction. In position "3" the roller 11a has been reversed and is rotating in a clockwise direction while the roller 11 continues rotating in a clockwise direction. In position "4" the roller 11a is reversed and is rotating in a counter-clockwise direction while the roller 11 continues to rotate in clockwise direction, in position "5" the roller 11a continues to rotate in a counter-clockwise direction while the roller 11 is reversed and rotates in a clockwise direction, this sequence continues down through steps 6, 7 and 8. The effect of the rotation of the rollers 11 and 11a in the same direction is rotation of fruit articles supported thereon in the opposite direction. The effect of the rollers 11 and 11a both rotating upwardly is to stop rotation of the fruit article, but article progression will continue, due both to effect of the roller rotation and to the lugs 19 of the belt 18. Therefore, the above sequence of operation of the rollers 11 and 11a will cause the article thereon to first rotate in one direction, then to be stationary as far as rotation is concerned, and then to rotate in the other direction as it progresses down the inclined rollers between two adjacent lugs 19 of the timing belt 18. With generally elongated or ovoid articles such as pears, prunes, walnuts, avocados, lemons, eggs, etc., the effect of this rotation, stopping, rotation and stopping, is to align these articles with their axes generally parallel to the axes of the rollers or parallel to the trough therebetween irrespective of their position when deposited on the rollers.

In operation, the intervals during which the two rollers 11 and 11a of each valley are rotated in the same direction and in opposite directions may be varied widely and still obtain the desired result of the quick alignment of the fruit or vegetable article by the successive rotation in one direction, a dwell, and then rotation in the opposite direction. The spacing apart of the rollers may be varied in accordance with the size of the article being aligned, also the vertical position of the timing belt 18 may be adjusted as well as the spacing apart of the lugs thereon. For example, with pears, with 2½ inches spacing between axes of the rollers 11 and 11a and with 1½ inches diameter of these rollers, the timing belt 18 need only be adjusted $\frac{5}{32}$ of an inch from the smallest pear to the largest pear in order for the belt to clear the large end of the pears. This timing belt 18 is desirably used for supporting the stem end of certain articles in order to prevent them turning entirely too far and to maintain their axes substantially in alignment with the direction of travel.

As a general result of the orienting performed by the rollers the fruit or vegetable articles, such as pears, for example, will be discharged in timed relation with their long axes similarly oriented and with certain pears fed stem end first and certain pears large end first for subsequent processing.

While I have shown and described a preferred embodiment of the invention, it is apparent that the invention is capable of variation and modification from the form shown so that the scope thereof should be limited only by the scope of the claims appended hereto.

I claim:

1. In a feeder and orienter for articles such as fruit and vegetable articles, a frame, a pair of rollers mounted in spaced apart parallel relation on said frame and in an inclined position from the article receiving end to the article discharge end to provide a fruit supporting trough therebetween, drive means for said rollers including means for first driving said rollers in the same direction to provide on their adjacent article contacting surfaces an upwardly moving surface on one roller and a downwardly moving surface on the opposite roller, means for thereafter reversing the direction of rotation of one of the rollers to provide both adjacent articles surfaces moving upwardly with respect to the articles positioned thereon, means for thereafter reversing the other of said rollers without reversing said one roller whereby the adjacent surfaces of the two rollers are again moving one upwardly and one downwardly with respect to an article but in the opposite sense from the first similar operation on the article, and means for maintaining articles separated as they travel down said roller in series fashion.

2. In a feeder and orienter for articles such as fruit and vegetable articles, a frame, a pair of rollers mounted in spaced-apart parallel relation on said frame in an inclined position from the article receiving end to the article discharging end to provide a fruit supporting trough therebetween, and drive means for said rollers including means for first driving said rollers in the same direction to effect turning of the article in one direction, means for thereafter effecting a dwell in the rotation of the articles, means for thereafter driving the rollers to turn the articles in the opposite direction, and means for maintaining articles separated as they travel down said rollers in series fashion.

3. In an article feed and orienting means, a frame, a pair of parallel rollers mounted on said frame in inclined position from the feed and toward the discharge end thereof, means for feeding articles to said rollers in spaced-apart relation as a single file, means driven in time with said feeding means for maintaining said spaced-apart relation of said articles as they travel along said rollers, means for driving said rollers to effect rotation of articles supported thereon in one direction, means for interrupting the article rotating effect of said rollers, means for thereafter driving said rollers to provide rotation of an article supported thereon in direction opposite to said one direction, and means for receiving said articles from said rollers in said spaced-apart relation and in oriented position.

4. In an article feed and orienting means, a frame, a pair of parallel rollers mounted on said frame in inclined position from the feed end toward the discharge end thereof, means for feeding articles to said rollers in spaced-apart relation as a single file, means driven in time with said feeding means for maintaining said spaced-apart relation of said articles as they travel along said rollers, means for driving said rollers to effect rotation of articles supported thereon in one direction, means for subsequently driving said rollers to provide rotation of an article supported thereon in an opposite direction, and means for receiving said articles from said rollers in said spaced-apart relation and in oriented position.

5. In an article feeding and orienting mechanism, a frame, a pair of rollers mounted in spaced-apart parallel inclined relation on said frame, drive means for said rollers including a first reversible means for driving one of said rollers and a second reversible means for driving the other of said rollers, and common means for controlling said reversing means to provide for rotation of the rollers for a given period of time in the same direction, means for effecting the control of said reversing means to cause rotation of both said rollers in an opposite direction to each other with their adjacent surfaces moving upwardly, means for thereafter controlling said reversing means to control rotation of said rollers in the same direction and opposite to said given direction, and means for maintaining a spaced-apart relation of articles traveling down said rollers.

6. In an article feeding and positioning mechanism, a frame, a pair of rollers mounted in spaced-apart parallel inclined relation on said frame, drive means for said rollers including reversible means for driving one of said rollers and a second reversible means for driving the other of said rollers, and common means for controlling said reversing means of both said rollers to provide for rotation of the rollers for a given period of time in the same direction, and means for thereafter controlling said reversing means to control rotation of said rollers in the same direction and opposite to said given direction, and means for maintaining a spaced-apart relation of articles traveling down said rollers.

7. A method of orienting articles of generally elongated shape which comprises feeding unoriented articles as a series in spaced-apart relation down an inclined feed path, rotating said articles in a given direction while traveling down said feed path to cause their long axes to align with said path, interrupting the rotation of articles while traveling down said path, rotating said articles in the opposite direction from said first direction of rotation to provide alignment of further articles, and receiving the articles from said feed path in spaced-apart relation and in oriented position.

8. A method of orienting generally elongated articles with their long axes in a given oriented position which comprises feeding articles in a single file and in spaced-apart relation, applying a rotative effect to rotate said articles in a given direction, interrupting the rotation of the articles, then rotating the articles in a direction opposite to said given direction, the combined effect of changing the direction of rotation and said interrupted rotation providing for positioning of an article with said axis at said given orientation, and receiving oriented spaced-apart articles.

9. In an article feed and orienting means, a frame, a pair of parallel rollers mounted on said frame in inclined position from the feed end toward the discharge end thereof, means for feeding articles to said rollers in spaced-apart relation as a single file, a conveyor positioned below and between said rollers having a plurality of equally spaced-apart article-separating projections extending upwardly between said rollers to form article-receiving and controlling pockets therewith, means for driving said rollers to effect rotation of articles supported thereon in one direction, means for subsequently driving said rollers to provide rotation of an article supported thereon in an opposite direction, and means for receiving said articles from said rollers in spaced-apart relation and in oriented position.

10. In an article feed and orienting means, a frame, a pair of parallel rollers mounted on said frame in inclined position from the feed end toward the discharge end thereof, means for feeding articles to said rollers in spaced-apart relation as a single file, means including a plurality of equally spaced-apart article separating projections extending upwardly between said rollers to form article receiving and controlling pockets therewith, means for driving said projections to effect travel thereof along said rollers, means for driving said rollers to effect rotation of articles supported thereon in one direction, means for subsequently driving said rollers to provide rotation of an article supported thereon in an opposite direction, and means for receiving said articles from said rollers in spaced-apart relation and in oriented position.

11. In an article feed and orienting means as cited in claim 10 in which said projections have a rounded contour, and means is provided extending between said projections to support the narrow end of an article to prevent excessive turning of the article with respect to said rollers.

References Cited by the Examiner

UNITED STATES PATENTS

| | | | |
|---|---|---|---|
| 2,596,798 | 5/1952 | Thompson | 198—33 |
| 2,911,082 | 11/1959 | Wenzel | 198—33 X |
| 3,163,282 | 12/1964 | Shropshire | 198—33 |

EVON C. BLUNK, *Primary Examiner.*

EDWARD A. SROKA, *Examiner.*